United States Patent [19]

Perkins et al.

[11] 4,200,199
[45] Apr. 29, 1980

[54] VACUUM BOTTLE CONSTRUCTION

[75] Inventors: William A. Perkins; William J. Tanner, both of Nashville, Tenn.

[73] Assignee: Aladdin Industries, Incorporated, Nashville, Tenn.

[21] Appl. No.: 829,600

[22] Filed: Sep. 1, 1977

[51] Int. Cl.² ............... A47J 41/02; B65D 25/14; B65D 25/18

[52] U.S. Cl. .................. 220/420; 215/13 R; 220/71; 220/430; 220/458

[58] Field of Search ............ 215/13, 12 A, 12 R, 215/13 R; 220/420, 421, 455, 456, 457, 458, 425, 445, 71, 431, 430

[56] References Cited

U.S. PATENT DOCUMENTS

| 889,992 | 6/1908 | Van Wye | 215/13 |
|---|---|---|---|
| 909,203 | 1/1909 | Neuner | 215/13 |
| 916,450 | 3/1909 | Keller | 215/13 |
| 921,729 | 5/1909 | Paalen | 215/13 |
| 1,421,325 | 6/1922 | Walker | 215/13 |
| 2,070,672 | 2/1937 | Moczala | 215/13 |
| 3,048,294 | 8/1962 | Osborn | 215/13 |
| 3,295,709 | 1/1967 | Herrick | 215/13 |
| 3,813,757 | 6/1974 | Bell | 215/13 |
| 3,845,873 | 11/1974 | Bridges | 215/13 |
| 3,863,794 | 2/1975 | Hata | 215/13 |

Primary Examiner—Alan N. Shoap

[57] ABSTRACT

A vacuum bottle construction as disclosed in which the vacuum filter is formed from a pair of concentric thin wall metal cylinders. The cylinders are formed of a thin metallic material, such as mild steel, which in and of itself is so thin as to be unable to withstand the pressure differential of atmospheric pressure on one side and a substantial vacuum on the other side. To prevent collapse of the outer thin wall cylinder due to this pressure differential means are provided in the space between the cylinders bearing against the outer wall to provide a force opposing that of the pressure differential.

12 Claims, 3 Drawing Figures

VACUUM BOTTLE CONSTRUCTION

BACKGROUND OF THE INVENTION

This invention relates generally to insulated containers. More specifically, it relates to improvements in vacuum insulated containers or thermos bottles.

To provide thermal insulation by the use of a substantial vacuum between the spaced side walls of a container is, of course, so well known as to require no extensive discussion. Generally, the prior art on this subject with which the applicants are familiar may be categorized according to the material from which the container is made.

First and most common, are those containers made of glass. Glass, while offering numerous advantages, has some disadvantages. Its greatest disadvantage is that it is subject to breakage both in the manufacturing process and in use. To minimize this problem the art has resorted to a number of devices. These include protection by a jacket of metal or plastic, means to adsorb shock and prevent movement of the glass in the jacket. Very frequently the thermos bottle is provided with a plastic liner to prevent glass from a broken filler from entering into a foodstuff held in the bottle. Another disadvantage of glass is its cost, which is a relatively high percentage of the cost of the entire container.

Another commonly used material for vacuum insulated containers is metal, particularly stainless steel. Vacuum or thermos bottles have been made from relatively thick metallic material for some time (see, for example, U.S. Pat. No. 3,331,522 assigned to the present assignee). These bottles, while practically eliminating the breakage problem, are quite costly to manufacture and, therefore, are costly to the consumer.

While glass and metal vacuum bottles are those most widely used in the industry, we are aware that in the literature it has been proposed to use other materials such as ceramics, plastics or various laminated constructions. To our knowledge none of these alternative constructions have ever appeared as commercially acceptable products for each apparently has its own set of problems. Plastics and ceramics may be porous and subject to outgassing, i.e., the release of entrapped gases in the material, thus destroying the vacuum. Laminates are costly and usually involve the use of plastics and natural materials which themselves are unsatisfactory as stated above.

In the light of the foregoing it is believed that significant advantages can be achieved by the provision of a vacuum or thermos bottle which is substantially free of the problems of the prior art.

Therefore, it is an object of this invention to provide a novel vacuum insulated container which is not subject to breakage, but is relatively economical to manufacture.

It is another object of this invention to provide a novel vacuum bottle made out of commonly available materials which are impervious and not subject to any significant outgassing.

It is a still further object of this invention to provide a novel vacuum container which may be fabricated using well known material and manufacturing techniques whereby it may be made relatively economically.

The application for a U.S. patent, Ser. No. 669,278, filed on Mar. 22, 1976, now abandoned, and refiled in a Continuation Application as Ser. No. 852,290, filed Nov. 17, 1977, now U.S. Pat. No. 4,138,027, issued Feb. 6, 1979 by A. L. Frye and H. M. Stewart and owned by the same assignee as is this application, there is shown the use of this wall concentric cylinders wherein the means for resisting collapse of the outer cylinder due to a pressure differential which is constituted by a rigid jacket extending over the external surface of the outer wall.

This application discloses and claims an alernative construction which is believed to offer advantages in some circumstances.

Therefore, it is a further object of this invention to provide a novel vacuum or thermos bottle which is more economical than those shown in the prior art.

It is another object of this invention to provide a novel vacuum or thermos bottle which can be easily manufactured using materials which are readily available from commercial sources.

It is still another object of this invention to provide a novel vacuum or thermos bottle which uses simply formed materials and can be relatively easy to assemble.

BRIEF STATEMENT OF THE INVENTION

The foregoing and other objects are achieved in various embodiments of the invention by the provision of a vacuum insulated container formed with inner or outer walls and shells of relatively thin metallic material, and which includes means within the vacuum space effective to resist atmospheric pressure on the outer wall of the container.

BRIEF DESCRIPTION OF THE DRAWING

The invention itself is set forth with particularity in the claims appended hereto and forming a part of this application. While an understanding of the structure of various embodiments there may be had by reference to the detailed description taken in conjunction with the drawing in which:

DETAILED DESCRIPTION

Figure 1:
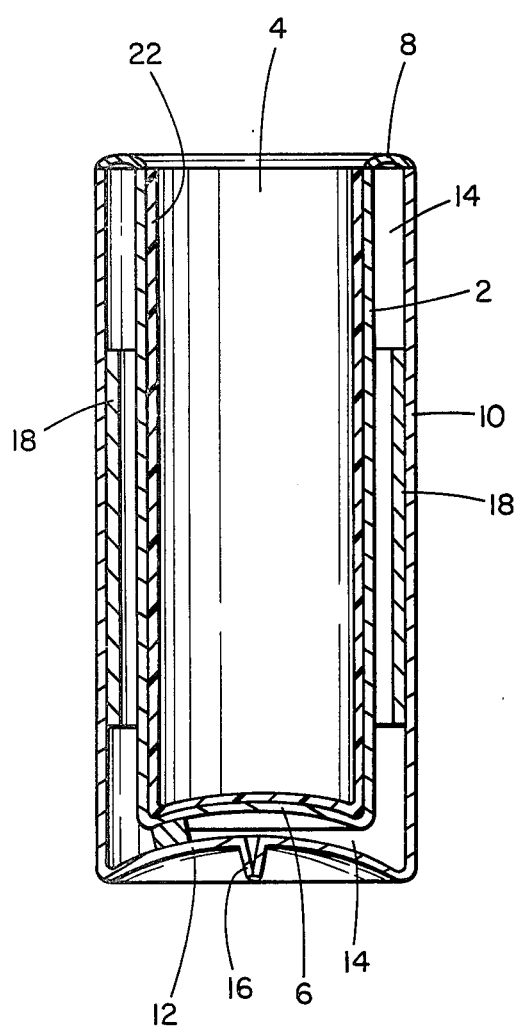
FIG. 1 is a cross sectional illustration of a first embodiment of the invention.

The first embodiment of the invention as seen in FIG. 1 comprises a container formed in part by an inner wall or shell 2 in the shape of a generally cylindrical container with an open top 4. The bottom 6 may be flat or, as shown, curved slightly upward. Joined to the inner shell 2 at its upper or open end, and designated by reference numeral 8, is an outer wall or shell 10 provided with a bottom 12 curved upwardly as is the bottom of inner shell 2.

As indicated, the inner shells and outer shells 2 and 10 are joined at the top 8 and provide an enclosed space 14. In order to evacuate or create a substantial vacuum in the space 14, a tube 16 is provided in the bottom 12 for connection to a suitable device for exhausting or withdrawing the air from the space 14. After the space 14 has been evacuated to the desired degree, the tube 16 is sealed by pressure and/or heat to maintain the vacuum therein. In accordance with the invention, the inner and outer shells or walls 2 and 10, respectively, are formed of a relatively thin metallic material. By relatively thin it is meant thin to a point that the outer shell 10 would collapse inwardly under atmospheric pressure, when the space 14 has been evacuated if no means for preventing such a collapse were present. In accordance with usual vacuum thermos bottle practice, it is desired to evacuate the space 14 so that the residual gas pressure is approximately 10 microns or less of mercury, and under these circumstances the net external pressure on the outer shell 10 will be almost 760 mm of Hg (one atmosphere) and that shell will collapse inwardly.

In various embodiments of the invention it is proposed to use as a material for the inner and outer shells 2 and 10 mild steel with or without a tin coating and of the type and thickness used for packaging beverages such as beer or soft drinks. Alternatively, the shells may be formed from aluminum. Such containers, as is well known, are produced in large quantities and are usually from 4 mils to 12 mils thick. Therefore, the shells may be constituted by such materials. If the shells are produced by the "drawn and ironed" method a lubricating layer of another material may be provided. For example, when mild steel is used a lubricating layer of tin is present.

The various embodiments of the invention are completed by providing a means within the evacuated space 14 and bearing against the inner surface of the outer shell 10 to provide a force resisting the atmospheric pressure on the outer surface of that shell.

In FIG. 1 this means is constituted by a cylindrical element 18 extending over the central portion of the outer shell 10. This ring can be formed of a metallic material and is in intimate contact with the inner surface of the outer shell over the weakest portion of that shell, namely, the area around the center of the vertical portion of the wall and some distance on either side.

No element comparable to element 18 is necessary to prevent deformation of the inner shell 2. This is because the pressure differential, which is uniform over the inner surface of the shell, exerts an outward stretching force (rather than an inward collapsing force) on the shell which is resisted by the strength of the material.

If desirable or necessary to resist rust, corrosion or the effects of acid foods on either shell 2 or 10, protective coatings of suitable inert materials, such as glass, plastic or other inorganic compositions may be provided as a liner 20. The liner or coating may be provided over all exterior surfaces of the container.

The thermal efficiency of containers in accordance with the invention may be improved by the use of a stainless steel, glass frit, ceramic or other gas impervious material joining the inner and outer shells at 8. Thus, both aluminum and mild steel, which have been proposed as suitable materials for those shells because of their mechanical qualities, have relatively high coefficients of thermal conductivity. Therefore, if another material having a smaller coefficient is used the heat transfer between the inner and outer shells will be reduced. The portion 8, formed of such a material may be joined to the shells by welding or any other suitable means such as an adhesive.

In addition, well known techniques useful in maintaining vacuums such as a gettering agent, and in reducing radiation losses such as silvering the interior surfaces of the shells, the introduction of multilayer wraps, or filling the annulus with fine particulates may be employed.

Figure 2:
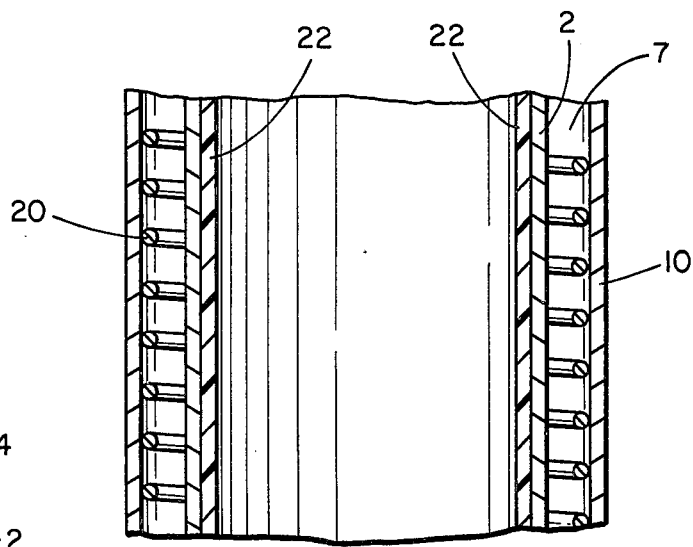
FIG. 2 is a partial view and cross section of another embodiment of the invention.

In FIG. 2 an alternative embodiment utilizes a compressed coil spring 20 bearing against the inner surface of the outer shell 10 instead of the element 18. The spring 20 inserted in the space 14 at a point in the manufacturing process before that space is sealed off and being under radial compression exerts an outwardly directed force resisting the force exerted by atmospheric pressure after the space 14 is evacuated. The spring is positioned to extend at least over the central portion of the vertical surface of the outer shell 10 or, if desired, over its entire length.

Figure 3:
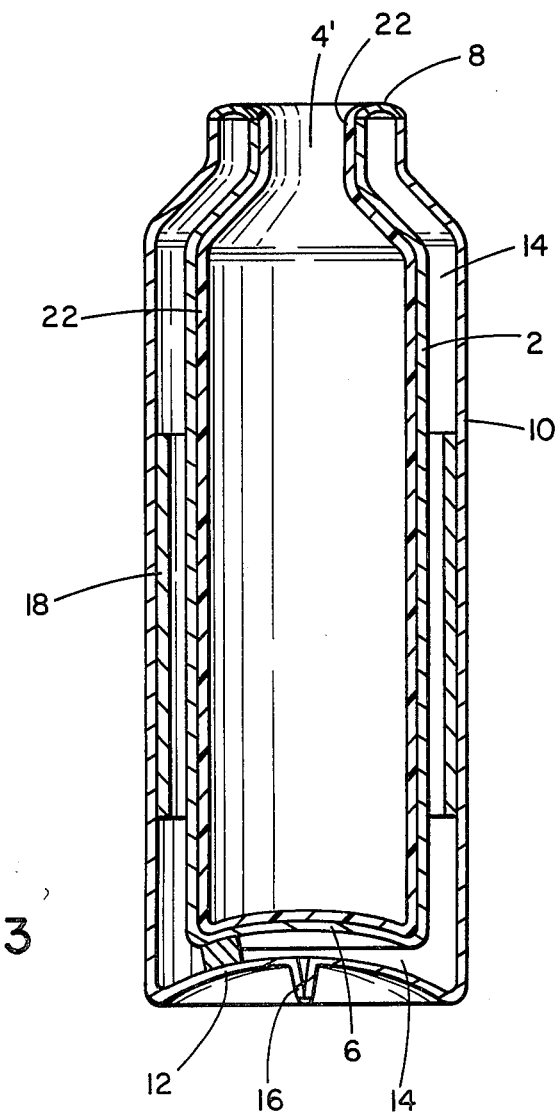
FIG. 3 is a side view of alternative design of various embodiments of the invention.

FIG. 3 illustrates another embodiment of the invention which can be selected by a designer. In contrast to the embodiment of FIG. 1, in FIG. 3 the top opening or mouth designated 4' is necked down to be relatively narrow. A vacuum container of this shape is particularly useful for holding liquids at a desired temperature.

Obviously changes in coating materials, shape, size and other aspects of the invention may be varied while still remaining within the scope of the invention, and is intended by the claims appended hereto to cover all such changes as come within their scope.

What is claimed as new and desired to be secured by Letters Patent is:

1. In a vacuum insulated container having sides, the bottom and open top constituted by an outer shell and an inner shell spaced from each other, joined at their tops to form the open top and with the space therebetween being substantially evacuated, and wherein said inner and outer shells are formed of a thin metallic material, said outer shell being so thin as to be collapsible inwardly under external ambient air pressure after said space has been evacuated, the improvement comprising: means in the evacuated space and in contact solely with the inner surface of said outer shell to strengthen at least the central vertical portion of said outer shell and to thereby prevent its collapse inwardly under external air pressure.

2. In the vacuum insulated container of claim 1, the further improvement wherein said means extend over the central vertical portion of said outer shell and some distance on either side of said vertical portion.

3. In the vacuum insulated container of claim 2, wherein said means is constituted by a cylindrical element bonded to said inner surface of said outer shell.

4. In the vacuum insulated container of claim 2, wherein said means is constituted by a coil spring engaging the inner surface of said outer shell and being in radial compression.

5. In the vacuum insulated container of claim 1, wherein said means is constituted by a cylindrical element bonded to said inner surface of said outer shell.

6. In the vacuum insulated container of claim 1, wherein said means is constituted by a coil spring engaging the inner surface of said outer shell and being in radial compression.

7. In the vacuum insulated container of claim 1, the further improvement wherein said inner and outer shells are joined at their tops by a material having a thermal conductivity coefficient which is lower than that of the material out of which the shells are formed.

8. In the vacuum insulated container of claim 7, wherein said means is constituted by a cylindrical element bonded to said inner surface of said outer shell.

9. In the vacuum insulated container of claim 7, wherein said means is constituted by a coil spring engaging the inner surface of said outer shell and being in radial compression.

10. In the vacuum insulated container of claim 1, wherein at least the inner surface of said inner shell is coated with a material resisting rust or corrosion.

11. In the vacuum insulated container of claim 10, wherein said means is constituted by a cylindrical element bonded to said inner surface of said outer shell.

12. In the vacuum insulated container of claim 10, wherein said means is constituted by a coil spring engaging the inner surface of said outer shell and being in radial compression.

* * * * *